United States Patent [19]

Tank et al.

[11] Patent Number: 5,148,235
[45] Date of Patent: Sep. 15, 1992

[54] MICHELSON INTERFEROMETER FOR PRODUCING OPTICAL PATH DIFFERENCES BY ROTATING CORNER CUBE RETROREFLECTORS

[75] Inventors: Volker Tank, Eching; Helmut Dietl; Peter Haschberger, both of München; Oliver Mayer, Neubiberg, all of Fed. Rep. of Germany

[73] Assignee: Deutsche Forschungsanstalt fur Luft- und Raumfahrt, Cologne, Fed. Rep. of Germany

[21] Appl. No.: 658,600

[22] Filed: Feb. 21, 1991

[30] Foreign Application Priority Data

Feb. 21, 1990 [DE] Fed. Rep. of Germany ....... 4005491
Apr. 26, 1990 [DE] Fed. Rep. of Germany ....... 4013399

[51] Int. Cl.$^5$ .............................................. G01B 9/02
[52] U.S. Cl. ................................................. 356/346
[58] Field of Search ..................................... 356/346

[56] References Cited

U.S. PATENT DOCUMENTS

4,652,130  3/1987  Tank ................................. 356/346
4,881,814  11/1989  Hoult .

FOREIGN PATENT DOCUMENTS

3005520   8/1981  Fed. Rep. of Germany .
A13446014 6/1986  Fed. Rep. of Germany .
8814391   4/1989  Fed. Rep. of Germany .
A13736694 6/1989  Fed. Rep. of Germany .
3836149   2/1990  Fed. Rep. of Germany .

OTHER PUBLICATIONS

Guelachvili, G. et al., "Recent Aspects of Fourier Transform Spectroscopy", vol. 3, Proceedings of the 6th International Conference on Fourier Transform Spectroscopy, Vienna, Aug. 24-28, 1987, *Mikrochim. Acta* [Wien] 1988, II, 319-321.

*Primary Examiner*—Samuel A. Turner
*Attorney, Agent, or Firm*—Browdy and Neimark

[57] ABSTRACT

In a Michelson interferometer for producing optical path differences, from a beam divider, a deflection mirror, an externally silvered corner mirror, a collective lens and a radiation detector an input/output module is formed, from two rotating retroreflectors and two stationary retroreflectors an intermediate module is formed, and from two further rotating retroreflectors and from a bilaterally silvered plane-parallel plate a termination module is formed. The three modules can be combined to an interferometer in such a manner that the plane mirrors of the corner mirror of the input/output module are each arranged opposite a respective input-side half of the two rotating retroreflectors of the intermediate module and between said reflectors which in turn are arranged directly next to and adjacent the two further rotating retroreflectors of the termination module in such a manner that the output-side aperture halves of the two stationary retroreflectors are aligned opposite the input-side aperture halves of the two further rotating retroreflectors of the termination module. In operation the respective adjacent rotating retroreflectors of the modules fixedly connected to each other in exact match rotate in-phase with respect to their rotational angle position and in opposite phase of 180° with respect to the corresponding opposite retroreflectors.

5 Claims, 9 Drawing Sheets

MICHELSON INTERFEROMETER FOR PRODUCING OPTICAL PATH DIFFERENCES BY ROTATING CORNER CUBE RETROREFLECTORS

BACKGROUND OF THE INVENTION

1. Field of the Invention

The invention relates to a Michelson interferometer for producing optical path differences comprising a rotating retroreflector, a beam splitter, a deflection mirror, an externally silvered corner mirror in the form of two plane mirrors offset 90° with respect to each other, a bilaterally silvered plane-parallel plate, a collective lens and a radiation detector.

2. Description of the Prior Art

In a classical interferometer of the Michelson type an interferogram is generated, i.e. the Fourier transform of the spectrum of the radiation, by dividing the beam to be investigated into two halves of equal amplitude and combining said halves again after passing along separate paths and deflecting them onto a radiation detector. In this manner, by continuous or stepwise changing of the length of the one path a path difference is generated and thus a varying phase between the two beam halves. The change in the path length is achieved by linear displacement of a mirror.

In a further development which is described for example in DE 34 31 040 C2, U.S. Pat. No. 4,652,130 and in EP patent 0 146 768 B1 the linear movement of the mirror is replaced by a rotation movement, that is by a nutation of a retroreflector, the rotation axis of which is arranged eccentrically and inclined with respect to the optical axis, i.e. the propagation direction of the radiation to be investigated. The spectral resolution of these known interferometers is proportional to the axial inclination and eccentricity of the rotating reflector. This in turn means that for a retroreflector of predetermined diameter the usability of the entire arrangement is limited by these two parameters. A too pronounced axial inclination leads for example to the radiation leaving the arrangement in undesirable manner whilst too pronounced an eccentricity reduces the useful beam diameter. Likewise, the spectral resolution is limited by the diameter of the retroreflector.

A disadvantage in these known apparatuses is therefore that reflectors with large aperture must be employed if a high spectral resolution is desired. Since the reflectors must fundamentally be of high optical quality, the expenditure increases with increasing aperture. Moreover, large reflectors, particularly for high speeds of rotation, require very precise balancing and consequently almost inevitably lead to larger and altogether heavier apparatuses.

Another disadvantage is that the setting of a resolution less than the maximum one can only be done by changing the axial inclination or the eccentricity of the rotating retroreflector. For this purpose, mechanical adjustments are necessary; moreover, this also changes the signal frequencies. For if at constant speed of rotation a smaller path difference is generated then at the same time a smaller part of the interferogram of which the signal frequencies are lower will be generated. In addition, the electronic signal filtering must be adapted to this fact.

SUMMARY OF THE INVENTION

The invention therefore has as its object the provision of a modular Michelson interferometer in which with relatively low expenditure for the individual optical components an increase in the path difference and the spectral resolution can be achieved and in which the resolution can be set or adjusted with little effort.

The invention therefore proposes in a Michelson interferometer for producing optical path differences comprising a rotating retroreflector, a beam splitter, a deflection mirror, an externally silvered corner mirror in the form of two plane mirrors offset 90° with respect to each other, a bilaterally silvered plane-parallel plate, a collective lens and a radiation detector, the improvement in which from the beam splitter, the deflection mirror, the externally silvered corner mirror, the collective lens and the radiation detector an input/output module is formed in which the one plane mirror of the corner mirror aligns with the beam splitter which is arranged parallel to the deflection mirror and at the same time at an angle of 45° to a symmetry plane (I) whilst the other plane mirror of the corner mirror is arranged perpendicularly to the beam splitter, from the one rotating retroreflector, a second rotating retroreflector and two additional retroreflectors an intermediate module is formed in which the two rotating retroreflectors arranged mirror-inverted with respect to the symmetry plane (I) face each other with their apertures, in which the two additonal retroreflectors likewise arranged mirror-inverted with respect to the symmetry plane (I) face each other with their rear sides and have their respective input-side aperture halves aligned with one of the output-side aperture halves of the two rotating retroreflectors, and in which the rotation axes of the two rotating retroreflectors are each offset laterally by the same distance with respect to the centres of the rotating retroreflectors and inclined at an angle to the respective optical axis of the rotating retroreflectors, from two further rotating retroreflectors and from the bilaterally silvered plane-parallel plate a termination module is formed in which the two further rotating retroreflectors arranged mirror-inverted with respect to the symmetry plane (I) are associated with each other with their apertures, in which a respective output-side half of the two rotating retroreflectors is arranged opposite the corresponding reflecting surface of the plane-parallel plate lying in the symmetry plane (I), and in which the rotation axes of the two further rotating retroreflectors are each offset laterally by the same distance (d) with respect to the centres of the further rotation retroreflectors and inclined at an angle to the respective optical axes of the rotating retroreflectors, and the three modules in the form of the input/output module, the intermediate module and the termination module are combined in a fixed connection to an interferometer in such a manner that the plane mirrors of the corner mirror of the input/output module offset 90° with respect to each other are each arranged opposite a respective input-side half of the two rotating retroreflectors of the intermediate module and between said reflectors, and the two rotating retroreflectors of the intermediate module are arranged directly next to and adjacent the two further rotating retroreflectors of the termination module in such a manner that the output-side aperture halves of the two stationary retroreflectors are aligned opposite the input-side aperture halves of the two further rotating retroreflectors of the termination module, the respective adjacent rotating retroreflectors of the modules fixedly connected to each other being in operation in-phase with respect to their rotational angle position and rotating in opposite phase of 180° with respect to the corresponding opposite retroreflectors.

Advantageous further developments of the interferometer according to the invention are defined by the features of the subsidiary claims.

The drives of at least one pair of retroreflectors are synchronized so that in normal operation for the maximum possible spectral resolution the change between maximum and minimum path in the two arms is opposite in phase (180°). Furthermore, the drives can be regulated so that this phase is variable between 180° and 0°. This permits an infinitely variable adjustment of the path difference and thus also of the spectral resolution; with a phase of 0° the path difference is then zero.

To obtain constant signal frequencies the rotation speed of the retroreflectors is reduced to the same extent as the phase thereof is increased and vice-versa. The case referred to above with a phase of 0° is excluded from the rotation speed regulation because in this case the rotation speed would have to be infinitely high and moreover any measurement would be meaningless.

When two stepping motors are used as drive for the retroreflectors, for example such a phase control can be effected via said stepping motors. The phase is set then by stepwise switching of only one of the two motors. In operation the two motors are then operated synchronously by simply driving them from the same pulse generator. To generate constant signal frequencies the pulse frequency and thus the rotation speed of the retroreflectors is adapted to the phase. For example, with a phase of 90° said rotation speed is to be set twice as high as with a phase of 180°.

According to a modified simplified embodiment of the invention only two rotating relectors in the form of triple mirrors are mounted on a common rotation axis and in their inclination and offsetting with respect to said rotation axis are set with respect to each other so that alternately in the one arm the optical path increases whilst it shortens in the other arm and vice-versa. In this embodiment the two retroreflectors are driven by only one motor, thereby obtaining a particularly exact synchronism, or in other words the path changes in the two arms are thereby coupled to each other so that the change of the path difference takes place continuously and thus gives only one quite specific resolution. Thus, in an interferogram generated using the interferometer according to the invention the signal frequencies are very constant and this is particularly advantageous for the further processing for example by a Fourier transformation, being indeed a requirement for the usefulness of such a processing. Moreover, this preferred embodiment of the interferometer according to the invention can be balanced in simple convenient manner.

BRIEF DESCRIPTION OF THE DRAWINGS

The invention will be described in more detail hereinafter with reference to examples of embodiment with the aid of the attached drawings, wherein.

DESCRIPTION OF THE PREFERRED EMBODIMENTS

Figure 1:
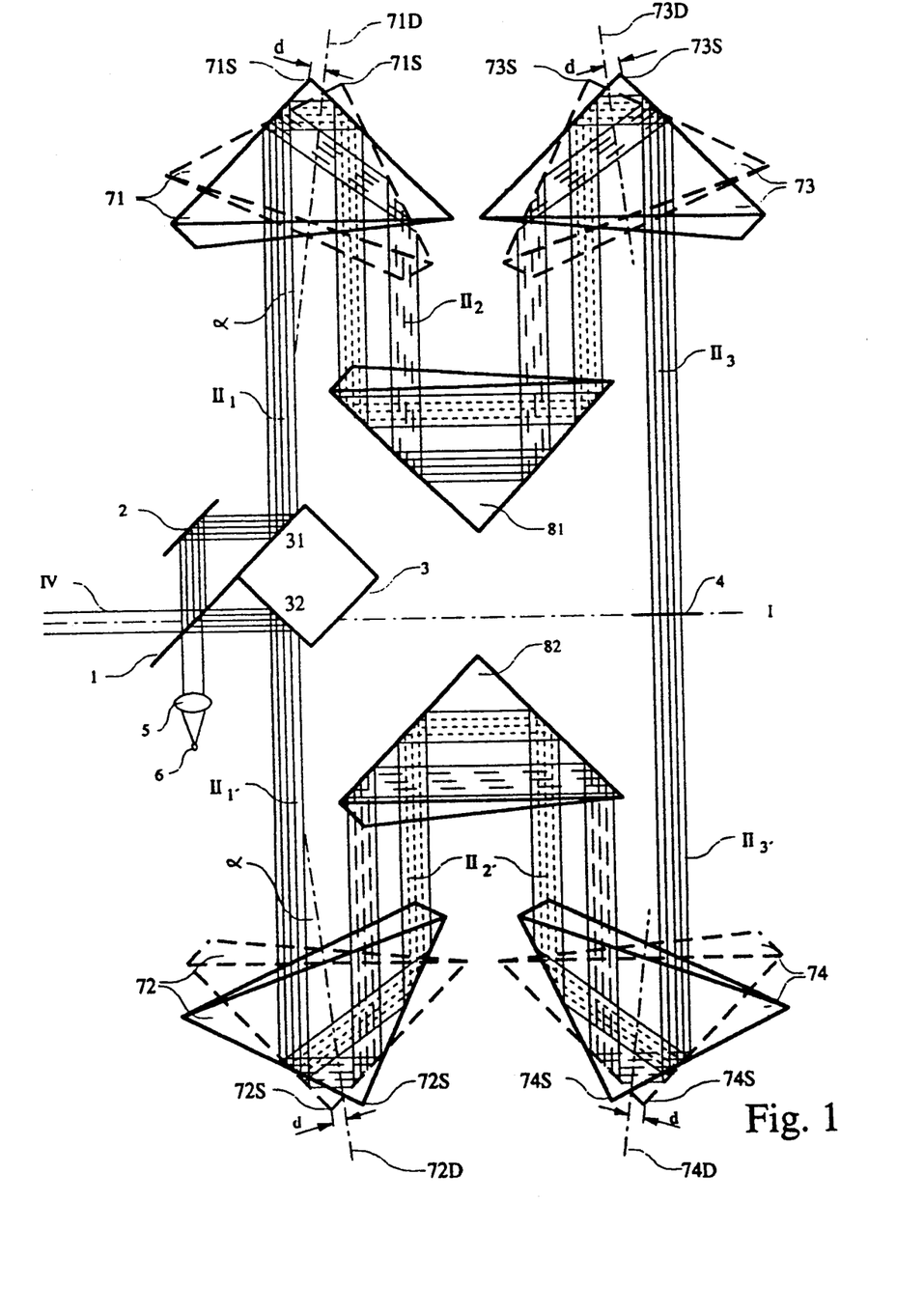
FIG. 1 shows an embodiment of an interferometer made up from modules according to FIGS. 2 to 4.
Figure 2:
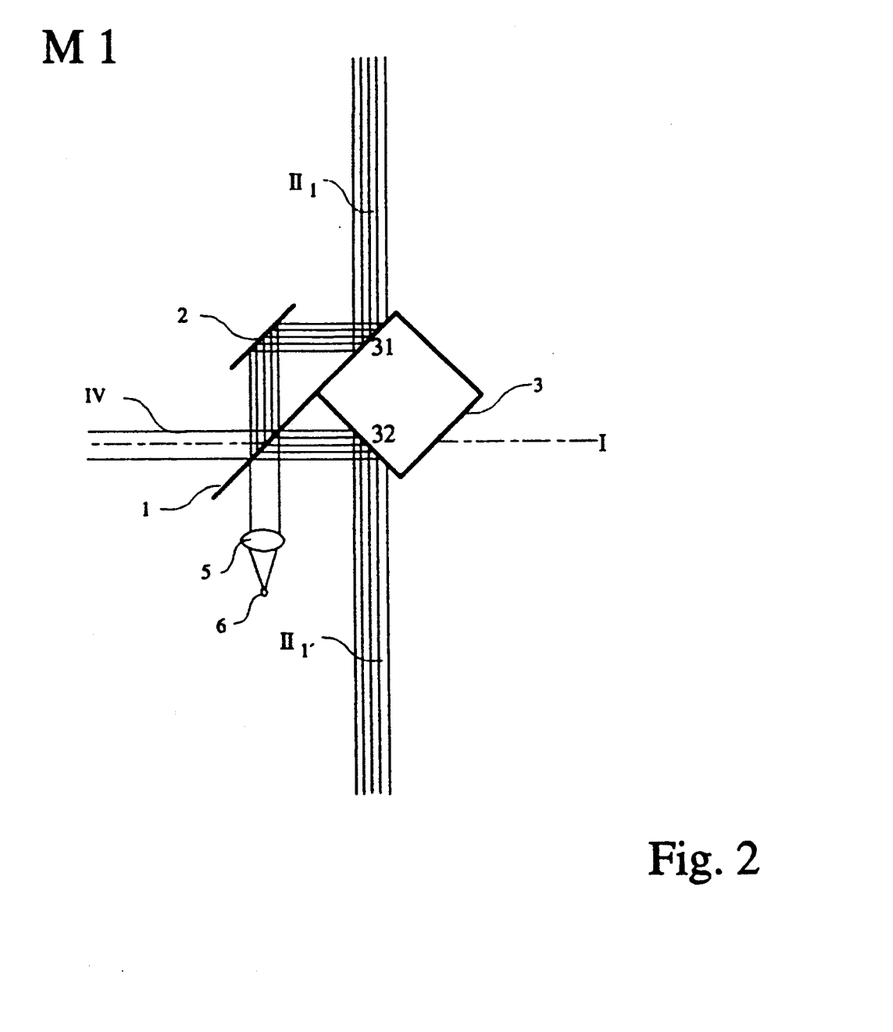
FIG. 2 shows an input/output module of the modular interferometer.
Figure 3:
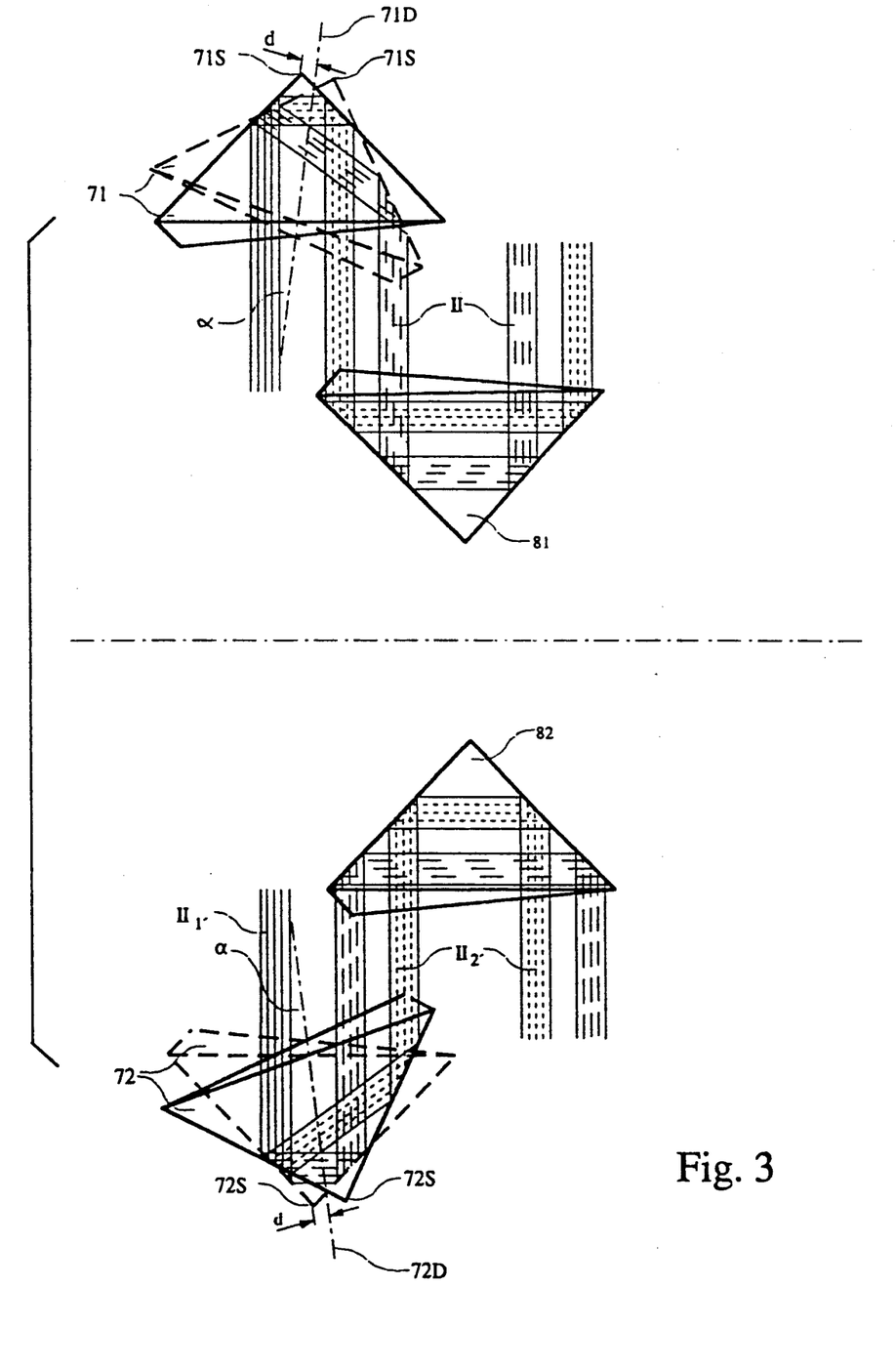
FIG. 3 shows an intermediate module of the interferometer having two rotating and two stationary retroreflectors.
Figure 4:
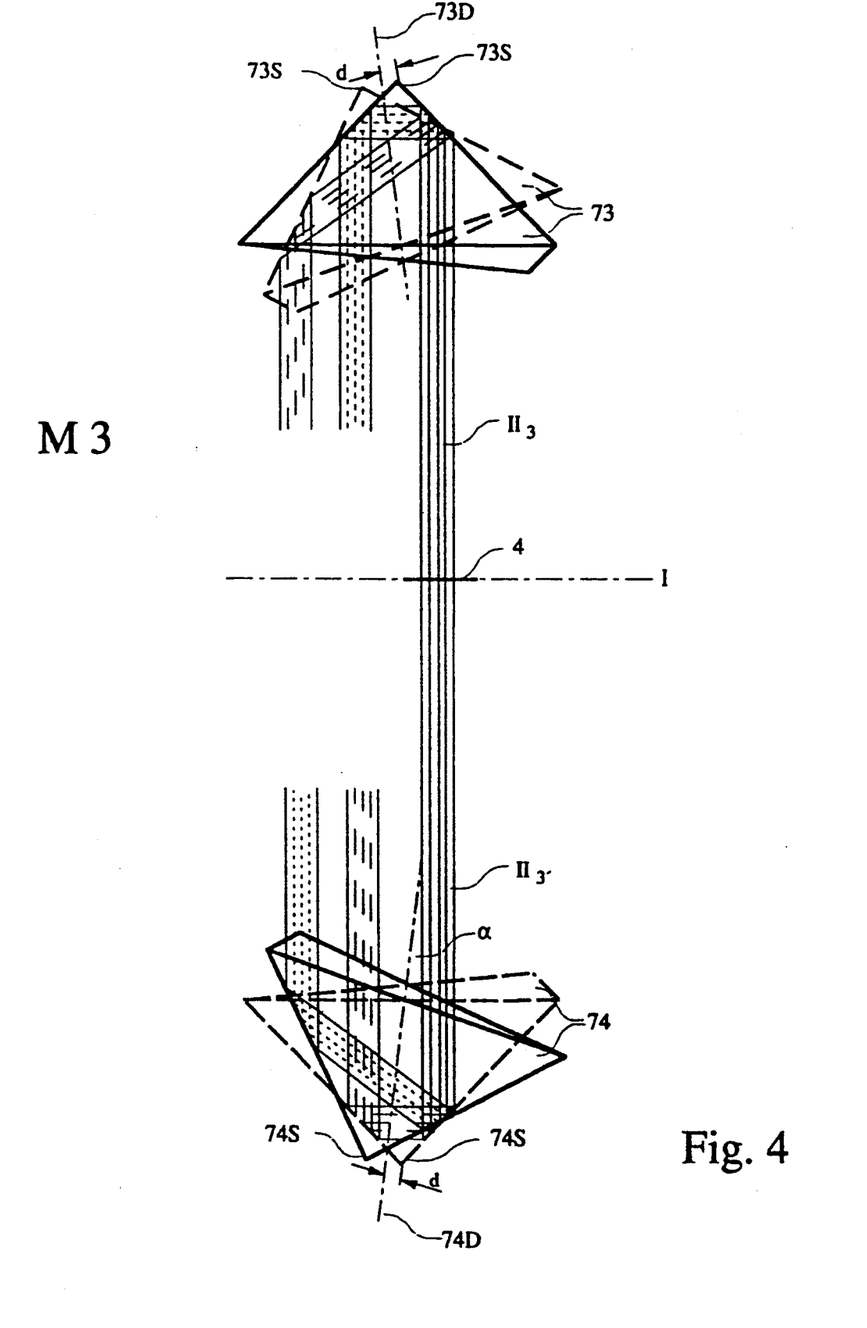
FIG. 4 shows a termination or end module of the interferometer having two rotating retroreflectors.

An interferometer illustrated in FIG. 1 is made up of a total of three modules shown in FIGS. 2 to 4, i.e. an input/output module M1 (FIG. 2), an intermediate module M2 (FIG. 3) and a corresponding termination module M3 (FIG. 4).

The input/output module M1 shown in FIG. 2 comprises a beam splitter or divider 1, a deflection mirror 2, an externally silvered corner mirror 3 in the form of two plane mirrors 31 and 32 offset 90° with respect to each other, a collective lens 5 and a radiation detector 6. The plane mirror 31 of the corner mirror 3 aligns with the beam splitter 1 arranged at 45° to a symmetry axis I. The deflection mirror 2 is arranged parallel to the beam splitter 1 and the plane mirror 31 of the corner mirror 3 aligning with said splitter and thus also at an angle of 45° to the symmetry plane I. The second plane mirror 32 of the corner mirror 3 is arranged perpendicularly to the first plane mirror 31 and thus also perpendicularly to the beam splitter 1. The collective lens 5 is arranged vertically beneath the beam splitter 1 so that a beam incident on said lens is focussed on the following radiation detector 6.

The intermediate module illustrated in FIG. 3 comprises two rotating retroreflectors 71 and 72 and two stationary retroreflectors 81 and 82. The two rotating retroreflectors 71 and 72 arranged mirror-inverted with respect to the symmetry plane I face each other with their apertures. The two stationary retroreflectors 81 and 82 are also mirror-inverted with respect to the symmetry plane I but so arranged that their rear sides face each other. The aperture halves of the two stationary retroreflectors 81 and 82 which are on the input side with respect to the entering rays are aligned with a respective one of the output-side aperture halves of the two rotating retroreflectors 71 and 72.

Furthermore, the rotation axes 71D and 72D of the two rotating reflectors 71 and 72 are each offset laterally by the same distance d with respect to their centres 71S and 72S lying in the retroreflector tip. The rotation axes 71D and 72D of the two retroreflectors 71 and 72 each run preferably parallel to the symmetry axes of the two retroreflectors 71 and 72 drawn (but not shown in detail) through the symmetry centres 71S and 72S respectively. Furthermore, the rotation axes 71D and 72D each enclose an angle $\alpha$ with the respective optical axis $II_2$ and $II_2'$ of the two retroreflectors 71 and 72.

The termination module M3 comprises two further rotating retroreflectors 73 and 74 and a bilaterally silvered plane-parallel plate 4. The two further rotating retroreflectors 73 and 74 are again also arranged mirror-inverted with respect to the symmetry plane I in such a manner that they respect to the symmetry plane I in such a manner that they face each other with their apertures. The halves of the two rotating retroreflectors 73 and 74 on the output side with respect to the emerging rays are aligned in such a manner that the respective aperture halves are each arranged opposite the corresponding mirror surface of the plane-parallel plate 4 which in turn aligns with the symmetry plane I. The rotation axes 73D and 74D of these two rotating retroreflectors 73 and 74 are also offset laterally by the same distance d with respect to the centres 73S and 74S representing the tips of the retroreflectors. Furthermore, the rotation axes 73D and 74D preferably extend parallel to the symmetry axes (not entered in detail) of the retroreflectors 73 and 74 and with the respective optical axes $II_3$ and $II_3'$ of the rotating retroreflectors 73 and 74 form an angle $\alpha$. In the drawings, for greater clarity the rotation axis is shown inclined to the symmetry axis an angle not designated exactly.

If, as illustrated in FIG. 1 and mentioned at the beginning, the three modules illustrated in FIGS. 2 to 4 and described above are associated with each other in accordance with their purpose and fixedly connected together in exact fit, a modular interferometer according to the invention can be formed from said three modules M1 to M3. In this case the plane mirrors 31 and 32 of the corner mirror 3 of the input/output module M1 offset 90° with respect to each other are arranged opposite a respective input-side aperture half of the two retroreflectors 71 and 72 of the intermediate module M2 and between said retroreflectors 71 and 72. Furthermore, the two rotating retroreflectors 71 and 72 of the intermediate module are arranged next to and adjacent the two further rotating retroreflectors 73 and 74 of the end or termination module M3 in such a manner that the aperture halves of the two stationary retroreflectors 81 and 82 on the output side with respect to the entering beam are exactly aligned with respect to the aperture halves on the input side, again with respect to the entering beam, of the two further rotating retroreflectors 73 and 74 of the termination module M3.

The individual components of the three modules M1 to M3 are chosen with respect to each other as regards their magnitude and adjustment in such a manner that the mode of operation described below is guaranteed in each rotational position of the rotating retroreflectors 71 to 74. A beam IV entering symmetrical to the symmetry plane I strikes the beam splitter 1 and is split by the latter into two equal-amplitude halves not designated in detail. The one beam half extending parallel to the symmetry plane I' passes as beam running parallel to the optical axis $II_1'$ via the plane mirror 32 of the corner mirror 3, the rotating retroreflector 72, the stationary retroreflector 82 and the rotating retroreflector 74 to the one side of the plane-parallel plate 4. After a reflection at the plane-parallel plate 4 the beam not designated in detail passes along the path described in the reverse direction back to the beam splitter 1.

The other beam half, likewise not designated in detail, passes as a beam extending parallel to the optical axis $II_1$ via the deflection mirror 2, the plane mirror 31 of the corner mirror 3, the rotating retroreflector 71, the stationary retroreflector 81 and the rotating retroreflector 72 to the other reflecting surface of the plane-parallel plate 4. After a reflection at the plane-parallel plate 4 the beam reflected symmetrically to the optical axis $II_3$ passes along the path described in the reverse direction back to the beam splitter 1.

The two incoming beams then interfere at the beam splitter 1 and are focused via the collective lens 5 on the radiation detector 6.

By the arrangement, adjustment and magnitude of the individual elements, it is ensured that the respective beams are not obstructed along their path in any rotation position of the rotating retroreflectors 71 to 74; these factors also exclude any possibility of the beams wholly or partially leaving the modular interferometer.

This is achieved inter alia in that the plane-parallel plate 4 aligns with the symmetry plane I and thus forms an angle of 45° with the beam splitter 1, that the beam splitter 1, as already explained in conjunction with the input/output module M1, aligns with the plane mirror 31 of the corner mirror 3 and is arranged parallel to the deflection mirror 2, and that the two plane mirrors 31 and 32 of the corner mirror 3 enclose an angle of 90°. It is further important that the incident beam IV strikes the beam splitter 1 at 45°. All these steps together result in the beams running symmetrically to the optical axes $II_3$ and $II_3'$ each striking the different sides of the plane-parallel plate 4 perpendicularly and thereby returning from said plate exactly to their origin on the beam splitter 1.

During operation the respective adjacent retroreflectors 71 and 73 of the intermediate module M2 and termination module M3 are in phase as regards their rotation position and in opposite phase of 180° to the retroreflectors lying opposite them, i.e. to the retroreflectors 72 and 74 of the intermediate module M2 and the termination module M3 respectively. Thus, by the rotating retroreflectors 71 and 73 the path of the corresponding beam is for example shortened whilst simultaneously by the rotating retroreflectors 72 and 74 the path of the corresponding beam is lengthened, and vice-versa.

The change of the optical path effected by a rotating retroreflector here is equal to four times the change (twice for both the forward travel and the reverse travel through the interferometer) of the vertical distance of the respective symmetry centres 71S to 74S from the plane-parallel plate 4 or the symmetry plane I. Since this path is preferably identical for the four retroreflectors 71 to 74, the total optical change is sixteen times the geometrical path change of one reflector.

The drives of the individual retroreflectors 71 to 74 are synchronized in technically known manner in such a way that in normal operation for the greatest spectral resolution the change between the maximum and the minimum path in the two arms of the interferometer is opposite in phase, i.e. offset 180°. Moreover, this phase may be changed from 180° to 0° via the drives. This thereby makes possible an infinitely variable adjustment of the path difference and thus also of the spectral resolution. With a phase of 0° the path difference is zero. To obtain constant signal frequencies, the rotation speed of the retroreflectors is reduced to the same extent as the phase thereof is increased and vice-versa. It should be noted in this connection that the case of 0° phase is excluded from the rotation speed control. In known manner, the offset, i.e. the distance d of the symmetry centres of the rotating retroreflectors, and the inclination angle $\alpha$ of the rotation axes of the individual retroreflectors are also determined with respect to the optical axes. Furthermore, the beam splitter 1, the corner mirror 3 and the deflection mirror 2 are adjusted with respect to each other and to the remaining elements in such a manner that for a predetermined rotational position of the retroreflectors the path length for the two beams is of equal length. It is ensured in this manner that the path difference of zero, i.e. the central maximum value of the measurement signal of the interferogram, is covered.

Furthermore, the plane-parallel plate 4 is mounted in such a manner that it is displaceable mechanically or alternatively electromechanically parallel to the symmetry plane I over the maximum path difference of the two arms of the interferometer. This makes it possible to shift the central maximum in its position in the time course of the interferogram or in its position in dependence upon the rotation position of the retroreflectors. In this manner, a symmetrical interferogram or also an interferogram with asymmetry of different degree can be obtained. At the same time, a different spectral resolution is set. With the aid of a symmetrical intreferogram in known manner spectra can then be calculated which are free from phase errors. Furthermore, a data recording and processing is also carried out in known manner with the modular interferometers according to the invention.

Just as in the case of the two plane mirrors 31 and 32 offset 90° with respect to each other and forming in this arrangement the corner mirror 3, instead of the plane-parallel plate 4 two correspondingly arranged plane mirrors may also be employed. Use of individual mirrors makes the production expenditure considerably lower and moreover additional degrees of freedom are obtained as regards the optical adjustment because individual mirrors can be adjusted independently of each other whilst the reflecting surfaces of the plane-parallel plate and of a rigid corner mirror are of course linked. Instead of the two fixed retroreflectors it would also fundamentally be possible to employ roof internal mirrors. This would however lead to greater complications in the optical adjustment. Furthermore, angles of the components with respect to each other different to those described are also possible as long as the conditions set forth above are maintained as regards the beam paths.

In the modular interferometer according to the invention, by using a plurality of smaller retroreflectors, for example 71 to 74 and 81 and 82, the same spectral resolution can be achieved as previously obtained by less but larger retroreflectors hitherto. An advantage with small retroreflectors is however that they are considerably cheaper than large retroreflectors and moreover also considerably easier to balance.

To still further lengthen the optical paths in a modular interferometer according to the invention, following the intermediate module M2 illustrated in FIG. 3 one or more correspondingly modified intermediate modules may be provided. The modified intermediate module or modules are to be altered here so that in each case two rotating reflectors of each modified intermediate module corresponding to the retroreflectors 71 and 72 are aligned with respect to the two stationary retroreflectors 81 and 82 of the preceding intermediate module M2 in such a manner that the two beams extending symmetrically to the optical axes $II_2$ and $II_{2'}$, i.e. the incoming and outgoing beams of the two stationary retroreflectors 81 and 82, are in each case reflected as two separate beams in the further rotating retroreflectors of the following intermediate module corresponding to the two retroreflectors 71 and 72. Thus, by interposition of intermediate modules corresponding fundamentally to the intermediate module M2 the optical path differences can be lengthened practically as desired.

Figure 5:
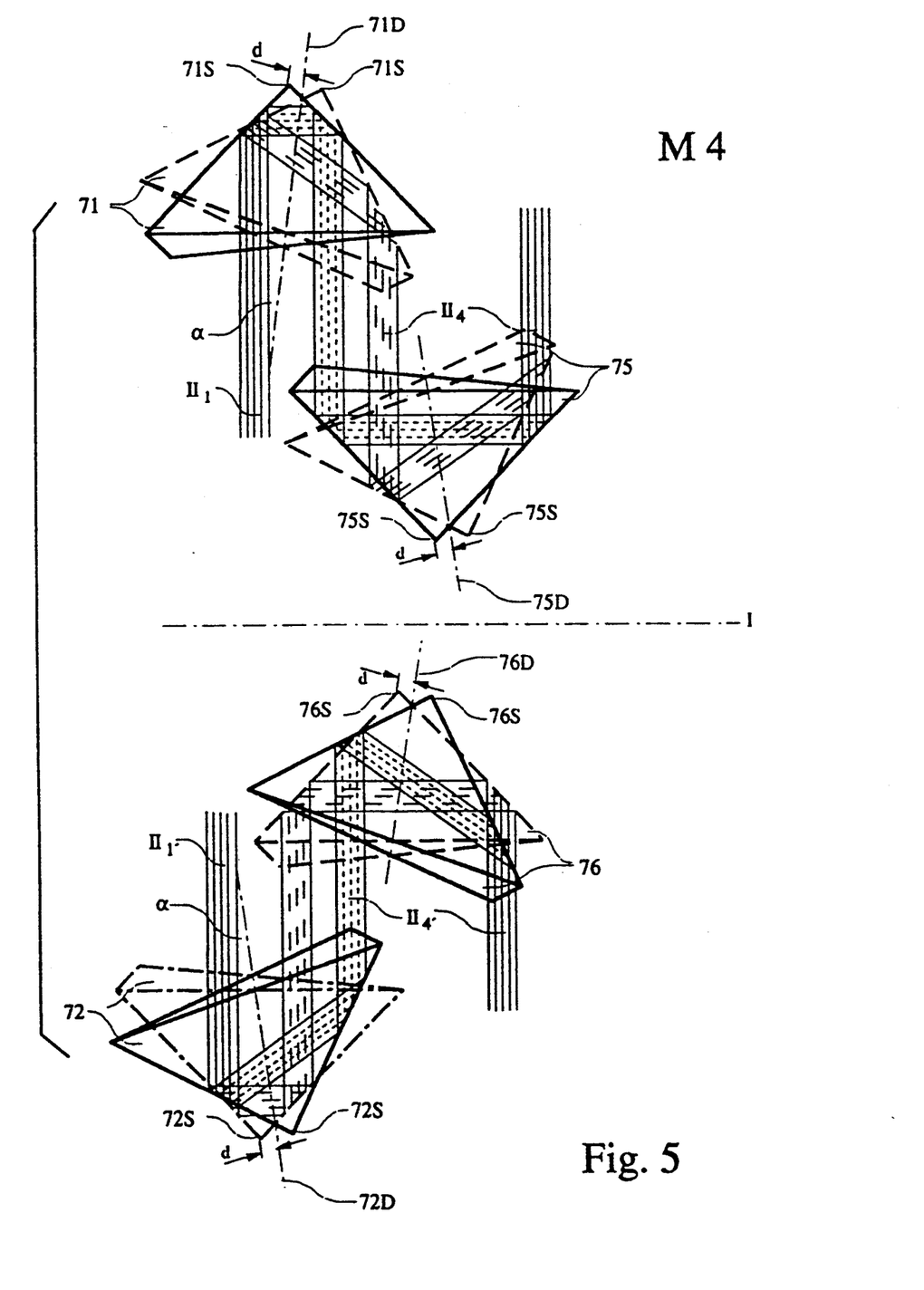
FIG. 5 illustrates an intermediate module modified compared with the embodiment of FIG. 3 of an interferometer having four rotating retroreflectors.

According to a preferred embodiment, to further increase the spectral resolution of a modular interferometer according to the invention instead of the two stationary retroreflectors 81 and 82 two further rotating retroreflectors may be provided, for example the retroreflectors 75 and 76, thereby giving an extended intermediate module M4 illustrated in FIG. 5. Analogously to the stationary retroreflectors 81 and 82 provided in the intermediate module M2, the two further rotating retroreflectors also face each other with their rear sides and their rotation axes 75D and 76D include with the corresponding optical axes $II_4$ and $II_{4'}$ an inclination angle $\alpha$ and are arranged with a corresponding axial offsetting d with respect to the symmetry centres 75S and 76S running through the tips of the rotating retroreflectors 75 and 76.

The two rotating retroreflectors 75 and 76 are driven as regards their rotational angle position in-phase with the respective associated retroreflectors 71 and 72 of the module M4 and the retroreflectors 73 and 74 of the termination module M3. This then intensifies the effect thereof by shortening or lengthening the paths for the beams extending parallel to the optical axes $II_4$ and $II_{4'}$ and $II_2$ and $II_{2'}$, and vice-versa. Thus, the total optical path change is twenty-four times the geometrical path change of one retroreflector.

Figure 6:
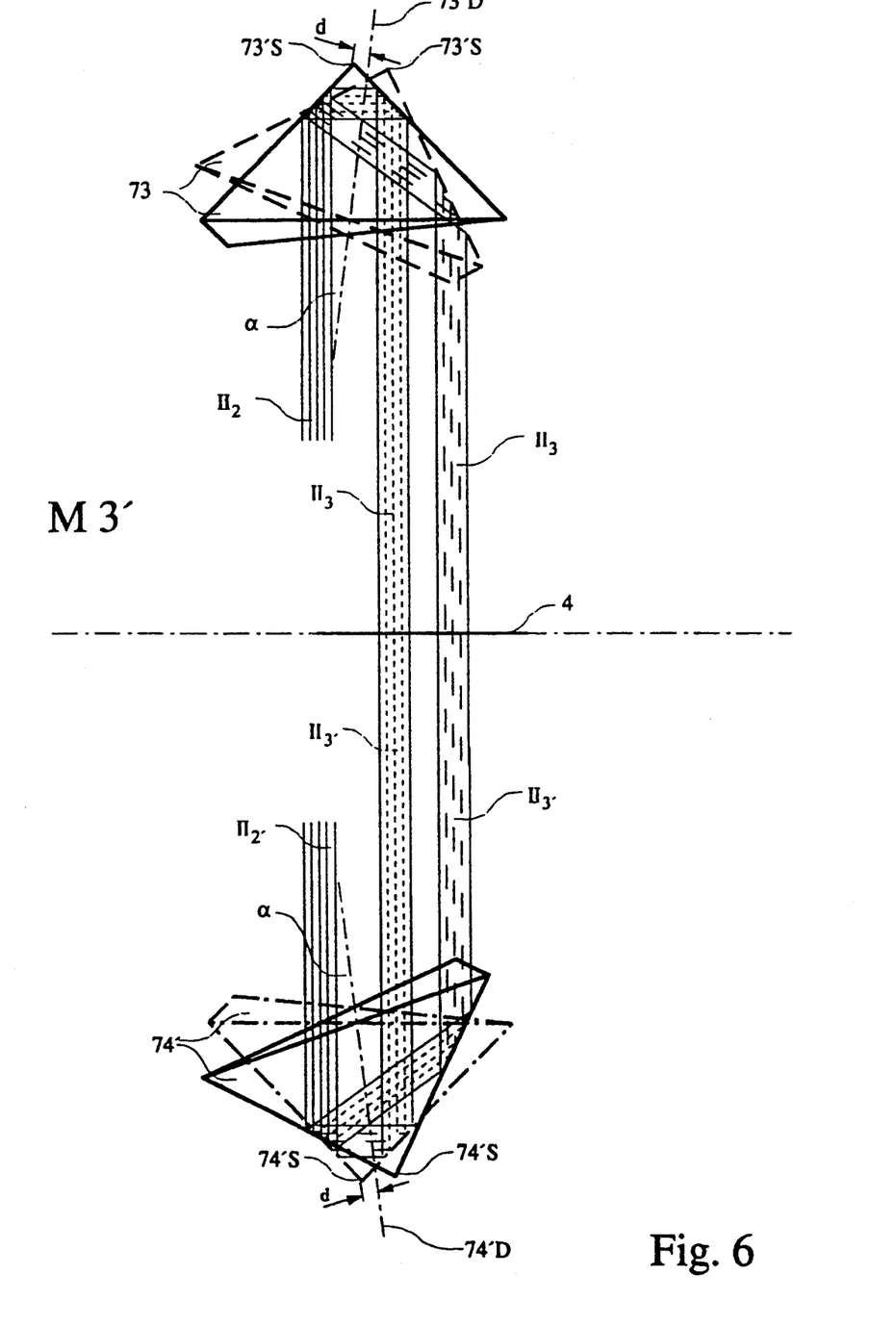
FIG. 6 shows a termination module adapted to the modified intermediate module of FIG. 5 for the interferometer having two rotating retroreflectors.

The optical path difference can be still further increased by arranging a plurality of intermediate modules M4 in succession between an input/output module M1 and a termination module M3' modified in accordance with FIG. 6; in this case, the modified termination module M3' corresponds in its fundamental structure completely to the different arrangement and alignment the rotating retroreflectors in FIG. 6 are denoted by a reference numeral provided with an apostrope (') to distinguish them from the corresponding retroreflectors in FIG. 4.

A particularly simple embodiment of the modular interferometer according to the invention, which is however perfectly adequate for various uses, can be obtained in that the input/output module M1 illustrated in FIG. 2 is combined and fixedly connected directly to the termination module M3' illustrated in FIG. 6 without interposition of intermediate modules.

Figure 7:
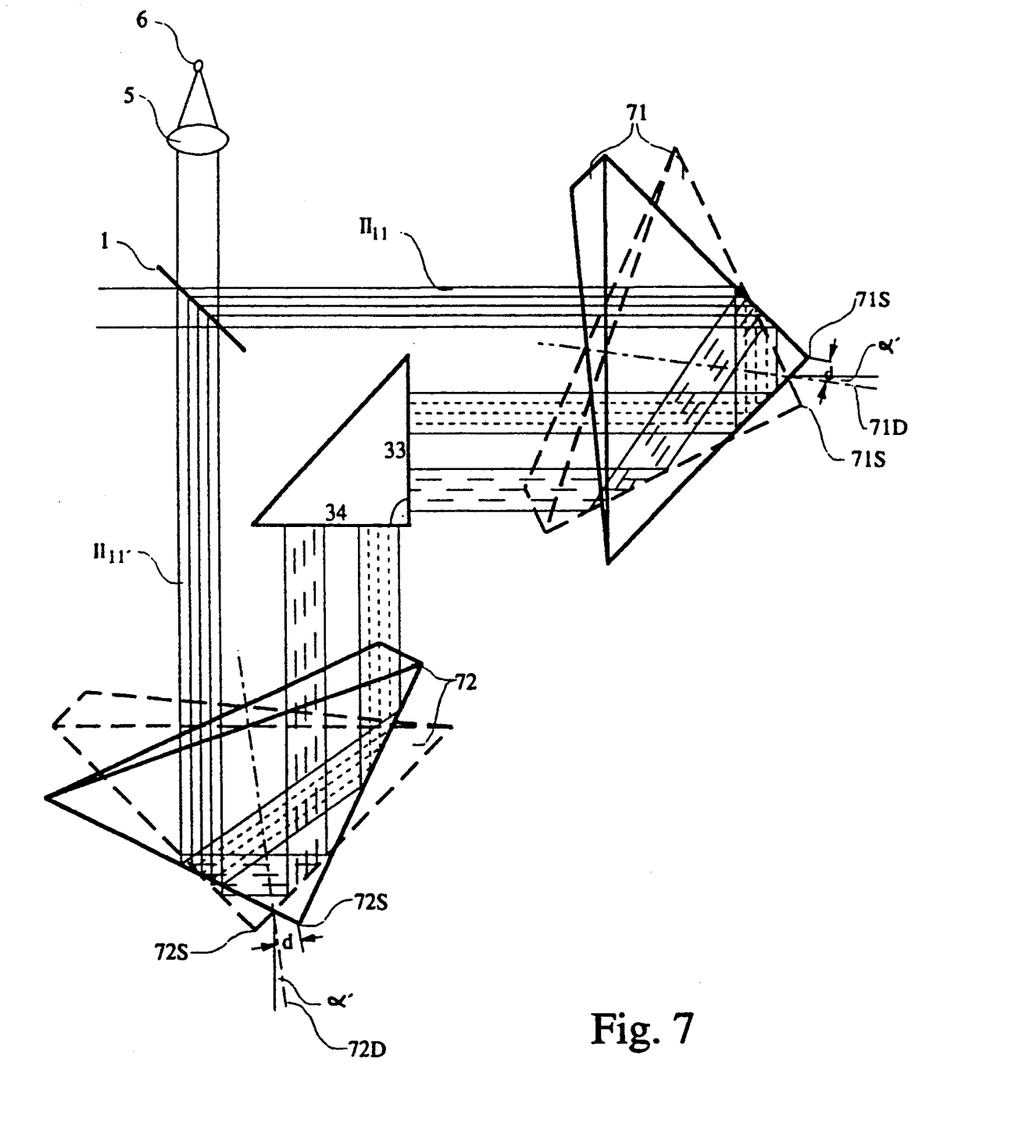
FIG. 7 shows a modified embodiment of an interferometer having only two mutually inclined reflectors rotating about separate rotation axes.

In the embodiment of FIG. 7 the components which are the same as the corresponding components of the previously described interferometer are denoted by the same reference numerals and consequently will not be described again. The interferometer according to FIG. 7 further comprises a first fixed mirror 33 and a second fixed mirror 34 perpendicular thereto which are arranged at 45° to the beam splitter 1. The rotation axes 71D and 72D of the two retroreflectors 71 and 72 are laterally offset a distance d with respect to the symmetry axes 71S and 72S of the two retroreflectors and inclined at an angle $\alpha'$. In the interferometer illustrated in FIG. 7 for the two retroreflectors 71 and 72 the drives are either respective motors not illustrateed or a common motor also not illustrated and having two cardan shafts or a belt transmission.

The two retroreflectors 71 and 72 are set in their angular position and direction of rotation with respect to each other in such a manner that the path lengths effected are in opposite directions. Since the setting is not changed during the operation this ensures that the rotation movements of the two retroreflectors 71 and 72 run synchronously. For this purpose the drives are coupled in known manner either mechanically or electrically. It is achieved in this manner that the optical path difference and thus the spectral resolution for a given measuring time, due to the opposite path changes in the two interferometer arms, are doubled in the interferometer according to FIG. 7, this being achieved in spite of using the same reflector size and the same geometrical path.

Figure 8:
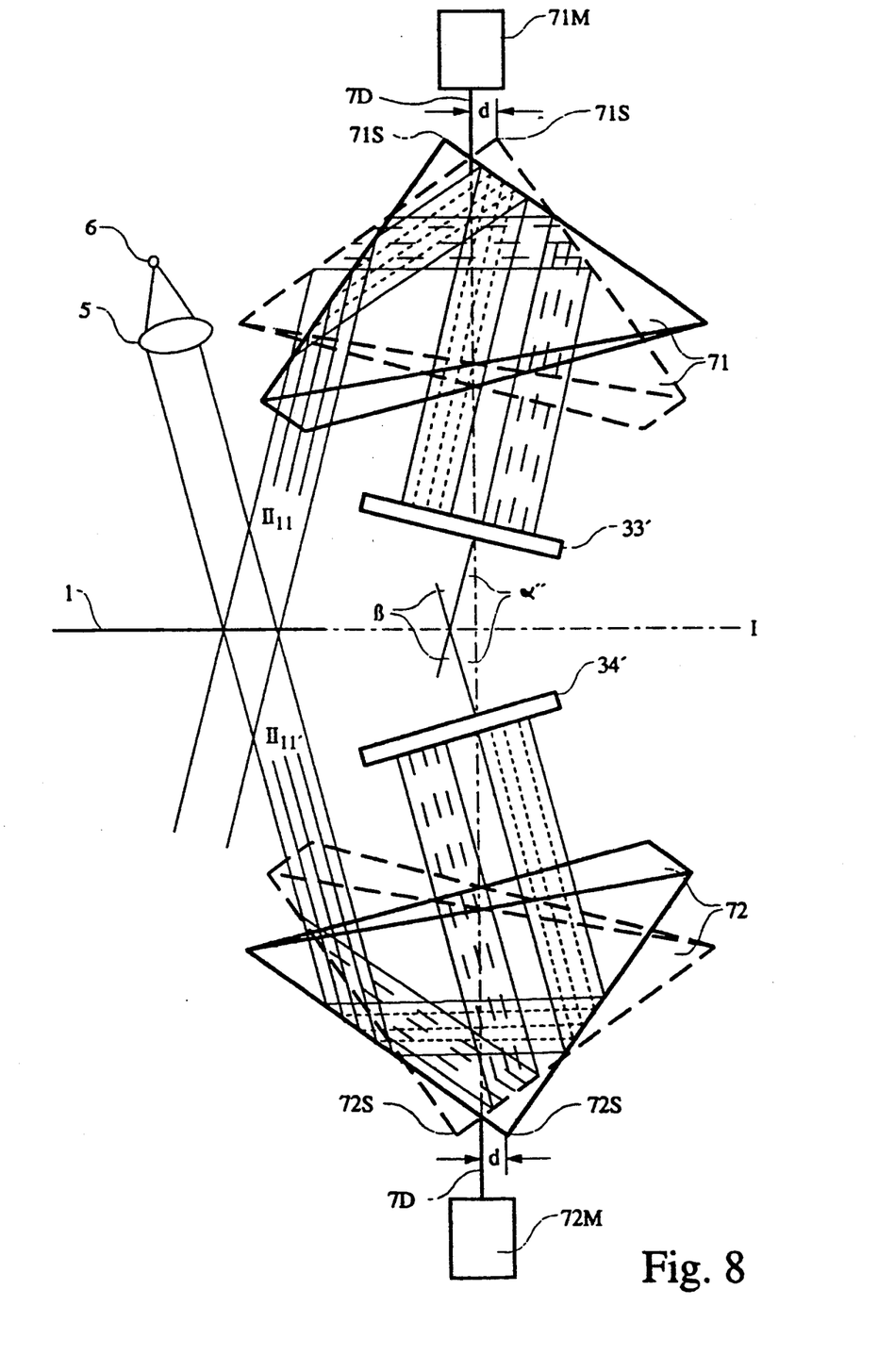
FIG. 8 illustrates an embodiment of an interferometer likewise having only two reflectors rotating about a common rotation axis.

In the embodiment of an interferometer in FIG. 8, in which the components which are the same as the corresponding components of the previously described interferometer are denoted by the same reference numerals and therefore will not be described again, in contrast to the embodiment of FIG. 7 the two reflectors 71 and 72 are arranged with their apertures facing each other and mirror-inverted with respect to the symmetry plane I. The beam splitter 1 is arranged in said symmetry plane I, laterally offset with respect to the two retroreflectors 71 and 72. Between the two retroreflectors 71 and 72 opposite the apertures thereof respective plane mirrors 33' and 34' are arranged instead of the two stationary mirrors 33 and 34.

In this case the two plane mirrors 33' and 34' are mounted and their magnitude selected in such a manner that a beam $II_{11}$ and $II_{11}'$ coming from one of the retroreflectors 71 or 72 strikes the plane mirrors 33' and 34' fully in every position of the two retroreflectors 71 and 72, i. e. with the entire diameter of the respective beam. However, it is advisable not be exceed the thereby defined magnitude of the two plane mirrors 33' and 34'.

In the interferometer according to FIG. 8 the two retroreflectors 71 and 72 have a common rotation axis 7D which is inclined an angle $\alpha''$ to the particular vertical onto the plane mirrors 33' and 34'. The plane mirror 33' and 34' are inclined an angle $\beta$ to each other. The two angles $\alpha''$ and $\beta$ are dimensioned in this embodiment so that $\alpha = 2\alpha''$ holds.

In this embodiment as well the roation axis 7D is laterally offset the distance d with respect to the corresponding symmetry centres 71S and 72S of the two retroreflectors 71 and 72. The retroreflectors 71 and 72 lying opposite each other symmetrically with respect to the symmetry axis I thus rotate eccentrically. The offsetting d in this case is determined taking account of the particualr inclination angle so that the spectral resolution of the interferometer is then defined by the inclination angle and the offsetting.

In the interferometer according to FIG. 8 the two retroreflectors 71 and 72 are preferably driven by two separate schematically indicated stepping motors 71M and 72M in such a manner that the path changes are opposite in phase. It is once again possible to obtain the infinitely variable adjustment of the path difference described above and thus of the spectral resolution. This is achieved by changing the rotation position of the two reflectors with respect to each other or by changing the degree of their "asynchronism" of phase; for the 180° the asynchronism is maximum, as is the path difference; both are zero with a 0°.

Figure 9:
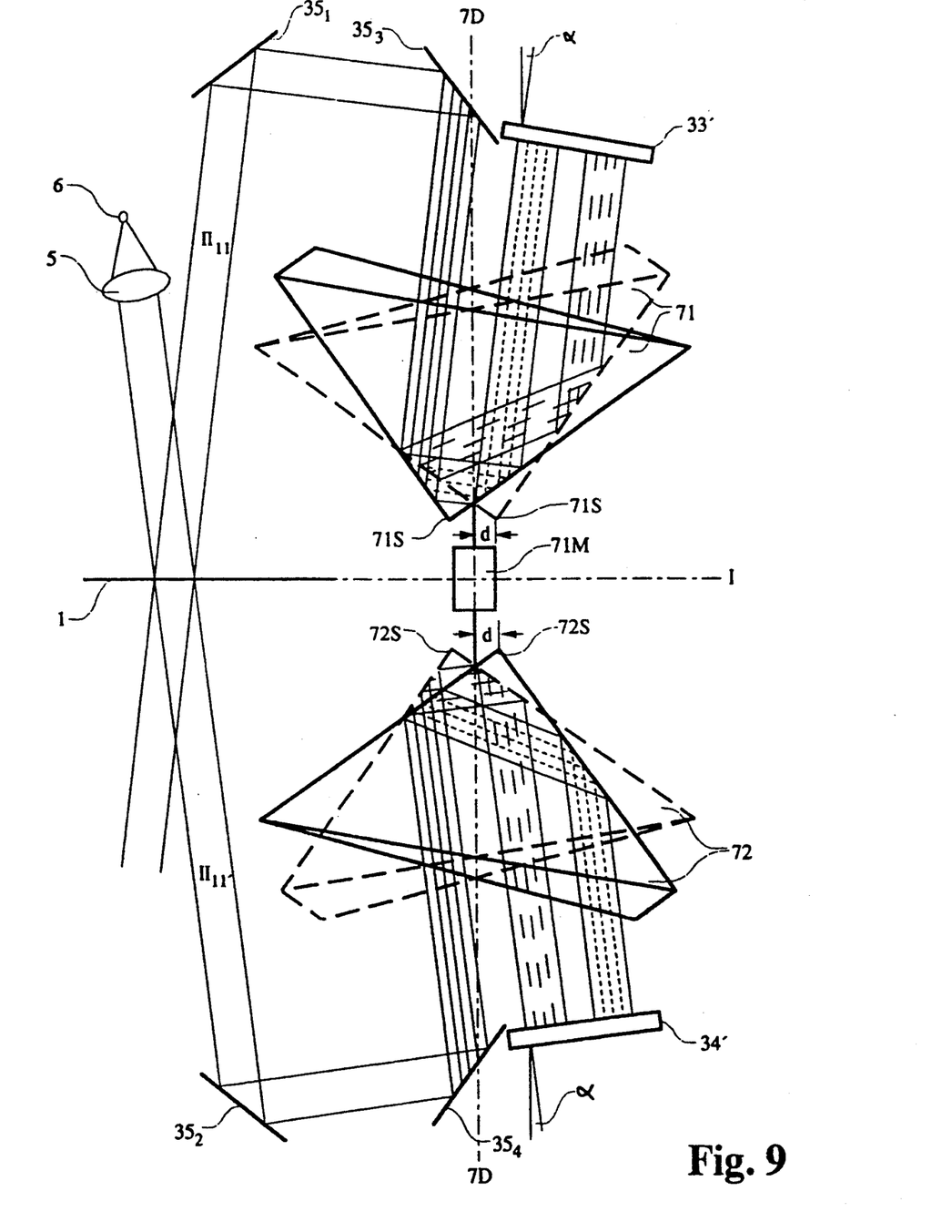
FIG. 9 shows a further embodiment of an interferometer having only two retroreflectors rotating about a common rotation axis.

In an embodiment of an interferometer according to FIG. 9 in which once again the same components as those in the embodiments described above are denoted by the same reference numerals, in contrast to the embodiments in FIGS. 7 and 8 the two retroreflectors 71 and 72 are arranged with their outer sides facing each other and in mirror symmetry to the plane of symmetry I. The two plane mirrors 33' and 34' are again arranged opposite the apertures of the two retroreflectors 71 and 72. As can be seen in FIG. 9, four deflection mirrors $35_1$ to $35_4$ are arranged in such a manner that the beams $II_{11}$ and $II_{11}'$ coming from the beam splitter 1 return to the beam splitter as shown by the path drawn.

In the embodiment of the interferometer according to FIG. 9 the reflectors 71 and 72 may also be rigidly connected to one of the two shaft ends of a motor 7M denoted by a block, the shaft of the motor 7M coinciding with the rotation axis 7A.

The modular configuration of the interferometer according to the invention described thus permits by its flexibility the implementation of practically all desired spectral resolutions. By any desired series connection of intermediate modules the previous restriction of the spectral resolution is thus overcome and eliminated with the modular interferometer according to the invention. A particular advantage of the invention is to be seen in that the spectral resolution is multiplied for a given measuring time due to the opposing path changes in the two interferometer arms. Consequently, there is also no need to increase the rotation speed and this in turn is advantageous as regards the balancing of the overall arrangement. It is therefore also possible by using a larger number of intermediate modules to multiply the measuring speed for a given rotation speed of the rotating retroreflectors and for the same spectral resolution.

This advantage is particularly pronounce compared with the classical Michelson interferometer in which translationally moved mirrors are employed. In the classical interferometers a high spectral resolution with simultaneously short measuring time could be achieved only by a high mirror speed. However, in the starting and stopping of the mirrors high alternating accelerations then occur. In contrast thereto, with the modular interferometer according to the invention the spectral resolution and the measuring time are independent of each other; moreover, there is no alternating acceleration because the retroreflectors rotate continuously.

We claim:

1. A modular Michelson interferometer for producing optical path differences comprising a first rotating retroreflector (71), a beam splitter (1), a deflection mirror (2), an externally silvered corner mirror (3) having a first plane mirror and a second plane mirror offset 90° with respect to each other, a bilaterally silvered plane-parallel plate (4), a collective lens (5) and a radiation detector (6), wherein from the beam splitter (1), the deflection mirror (2), the externally silvered corner mirror (3), the collective lens (5) and the radiation detector (6), an input/output module (M1) is formed in which the first plane mirror (31) of the corner mirror (3) aligns with the beam splitter (1) which is arranged parallel to the deflection mirror (2) and at the same time at an angle of 45° to a symmetry plane (I) whilst the second plane mirror (32) of the corner mirror (3) is arranged perpendicularly to the beam splitter (1), from the first rotating retroreflector (71), a second rotating retroreflector (72) and two additional retroreflectors (81, 82), an intermediate module (M2) is formed in which the first and the second rotating retroreflectors (71, 72) arranged mirror-inverted with respect to the symmetry plane (I) face each other with their apertures, in which the two additional retroreflectors (81, 82) likewise arranged mirror-inverted with respect to the symmetry plane (I) face each other with their rear sides and have their respective input-side aperture halves aligned with one of the output-side aperture halves of the first and second rotating retroreflectors (71 72), and in which rotation axes (71D, 72D) of the first and second rotating retroreflectors (71, 72) are each offset laterally by the same distance with respect to centres (71S, 72S) of the first and second rotating retroreflectors (71, 72) and inclined at an angle ($\alpha$) to an optical axis of the first rotating retroreflector (71), and of the second rotating retroreflector (72) respectively from two further rotating retroflectors (73, 74) and from the bilaterally silvered plane-parallel plate (4), a termination module (M3) is formed in which the two further rotating retroreflectors (73, 74) arranged mirror-inverted with respect to the symmetry plane (I) are associated with each other with their apertures, in which a respective output-side half of the two further rotating retroreflectors (73, 74) is arranged opposite a corresponding reflecting surface of the plane-parallel plate (4) lying in the symmetry plane (I), and in which rotation axes (73D, 74D) of the two further rotating retroreflectors (73, 74) are each offset laterally by the same distance (d) with respect to the centres (73S, 74S) of the two further rotating retroreflectors (73, 74) and inclined at an angle ($\alpha$) to the respective optical axis of the rotating retroreflectors (73, 74), and wherein the input/output module (M1), the intermediate module (M2) and the termination module (M3) are combined in a fixed connection to an interferometer in such a manner that the plane mirrors (31, 32) of the corner mirror (3) of the input/output module (M1) offset 90° with respect to each other are each arranged opposite a respective input-side half of the two rotating retroreflectors (71, 72) of the intermediate module (M2) and between said retroreflectors (71, 72), and the two rotating retroreflectors (71, 72) of the intermediate module (M2) are arranged directly next to and adjacent the two further rotating retroreflectors (73, 74) of the termination module (M3) in such a manner that the output-side aperture halves of the two stationary retroreflectors (81, 82) are aligned opposite the input-side aperture halves of the two further rotating retroreflectors (73, 74) of the termination module (M3), the respective adjacent rotating retroreflectors (71, 73; 72, 74) of the modules (M1, M2, M3) fixedly connected to each other being in operation in-phase with respect to their rotational angle position and rotating in opposite phase of 180° with respect to the corresponding opposite retroreflectors (71, 72; 73, 74).

2. A modular interferometer according to claim 1, wherein for increasing the optical path differences after the intermediate module (M2) and before the termination module (M3) one or more modified intermediate modules are provided which are modified in that in each case two additional further rotating retroreflectors of each modified intermediate module are aligned with respect to the two stationary retroreflectors (81, 82) of the preceding intermediate module in such a manner that the emerging beams of the two stationary retroreflectors (81, 82) of the respective preceding intermediate module are reflected as two separate beams into the corresponding two additional further rotating retroreflectors of the following intermediate module.

3. A modular interferometer according to claim 1, wherein to increase the spectral resolution instead of the two additional retroreflectors (81, 82) a modified intermediate module (M4) also comprises still two further rotating retroreflectors (75, 76) which face each other with their rear sides and have a corresponding inclination angle ($\alpha$) of their rotation axes (75D, 76D) with respect to the optical axes ($II_4$, $II_4$,) and corresponding axial offsetting (d) with respect to their centres (75S, 76S), and in operation the still two further retroreflectors (75, 76) facing each other with their rear sides each rotate in phase as regards the rotation angle position with the first and second retroreflectors (71, 72) arranged opposite them.

4. A modular Michelson interferometer according to claim 1, wherein for further increasing the optical path differences in an interferometer two or more modified intermediate modules (M4) are provided between the input/output module (M1) and a modified termination module (M3').

5. A modular Michelson interferometer for producing optical path differences comprising a first rotating retroreflector (73'), a beam splitter (1), a deflection mirror (2), an externally silvered corner mirror (3) having a first and a second plane mirror at 90° to each other a bilaterally silvered plane-parallel plate (4), a collective lens (5) and a radiation detector (6), wherein from the beam splitter (1), the deflection mirror (2), the externally silvered corner mirror (3), the collective lens (5) and the radiation detector (6), an input/output module (M1) is formed in which the first plane mirror (31) of the corner mirror (3) aligns with the beam splitter (1) which is arranged parallel to the deflection mirror (2) and simultaneously at an angle of 45° to a symmetry plane (I) whilst the second plane mirror (32) of the corner mirror (3) is arranged perpendicularly to the beam splitter (1), from the first rotating retroreflector (73'), a fourth rotating retroreflector (74') and the bilaterally silvered plane-parallel plate (4) a further termination module (M3') is formed in which the first and fourth rotating retroreflectors (73', 74') arranged mirror-inverted with respect to the symmetry plane (I) are associated with each other with their apertures, in which the an output-side half of the first and fourth rotating retroreflectors (73', 74') is arranged opposite the respective corresponding reflecting surface of the plane-parallel plate (4) lying in the symmetry plane (I), and in which rotating axes (73'D, 74'D) of the first and fourth rotating retroreflectors (73', 74') are each offset by the same distance (d) with respect to centres (73'S, 74'S) of the first and fourth rotating retroreflectors (73', 74') and inclined at an angle ($\alpha$) to an optical axis of the first rotating retroreflector (73'), and of the fourth rotating retroreflector (74') respectively the two modules in the form of the input/output module (M1) and the termination module (M3') are combined in fixed connection to give an interferometer in such a manner that the plane mirrors (31, 32) of the corner mirror (3) at 90° to each other are each arranged opposite a respective input-side half of the two rotating retroreflectors (73', 74') and between the latter, and in operation the two retroreflectors rotate in opposite phase of 180° as regards their rotation angle position.

* * * * *